United States Patent
Chang et al.

(10) Patent No.: US 7,070,713 B2
(45) Date of Patent: Jul. 4, 2006

(54) MOISTURE ACTIVATED SINGLE-COMPONENT EBONITE COMPOSITION

(75) Inventors: Rong Jong Chang, Fremont, CA (US); Tuan Nguyenquang, Sunnyvale, CA (US); Surjit Gill, San Jose, CA (US)

(73) Assignee: 3L & T, Inc, Mountain View, CA (US)

( * ) Notice: Subject to any disclaimer, the term of this patent is extended or adjusted under 35 U.S.C. 154(b) by 149 days.

(21) Appl. No.: 10/766,533

(22) Filed: Jan. 27, 2004

(65) Prior Publication Data

US 2004/0254303 A1    Dec. 16, 2004

Related U.S. Application Data

(60) Provisional application No. 60/443,125, filed on Jan. 27, 2003.

(51) Int. Cl.
*C08F 255/00*    (2006.01)
*C08K 3/10*    (2006.01)
*C08K 3/34*    (2006.01)
*C08K 5/36*    (2006.01)
*C08K 5/54*    (2006.01)

(52) U.S. Cl. ............ 252/502; 252/519.31; 252/519.33; 524/261; 524/264; 524/265; 524/266; 524/267; 524/268; 524/269

(58) Field of Classification Search ................ 524/261, 524/264, 265, 266, 267, 268, 269; 252/519.31, 252/519.33, 507

See application file for complete search history.

(56) References Cited

U.S. PATENT DOCUMENTS

| 5,766,687 A | 6/1998 | Rappoport ................ 427/386 |
| 5,997,953 A | 12/1999 | Rappoport ................ 427/386 |
| 6,482,894 B1 | 11/2002 | Chang et al. ................ 525/191 |
| 2002/0002244 A1 | 1/2002 | Hoelter et al. .............. 525/107 |

FOREIGN PATENT DOCUMENTS

| DE | 3740181 A1 | 11/1987 |
| WO | WO 00/06639 | 2/2000 |

*Primary Examiner*—Ana Woodward
(74) *Attorney, Agent, or Firm*—Lumen Intellectual Property Services, Inc.

(57) ABSTRACT

A single component sag-free liquid ebonite composition having silane coupling agents selected to chemically bond and convert liquid unsaturated rubber to alkoxy functionality, to consume and scavenge moisture originally present in the mixture, and to react with sulfur during vulcanization. The single component liquid ebonite composition is moisture activated and is particularly useful for coating applications in protecting metal from corrosion and chemical attack. In some embodiments, the liquid ebonite composition having a total mass percentage of 100 is mainly composed of liquid unsaturated rubber, sulfur, a vulcanization activator, a vulcanization accelerator, a first silane, a second silane, and a third silane. With the right reactive functional group, the third silane can replace the first or second silane. In some embodiments, the liquid ebonite composition includes a catalyst, carbon black, fillers, additives, and a diluent or solvent.

17 Claims, No Drawings

MOISTURE ACTIVATED SINGLE-COMPONENT EBONITE COMPOSITION

CROSS-REFERENCE TO RELATED APPLICATIONS

This application claims priority from a provisional patent application No. 60/443,125, filed Jan. 27, 2003, the content of which is incorporated herein by reference.

FIELD OF THE INVENTION

This invention relates generally to ebonite compositions useful for protecting metals from corrosion and chemical attack. More particularly, it relates to a single-component moisture activated liquid ebonite coating that does not require premixing and does not sag or run off.

DESCRIPTION OF THE BACKGROUND ART

Ebonite or hard-rubber linings have been used for decades for protecting metals from corrosion or chemical attack as documented in "Corrosion Prevention by Protective Coatings, Second Edition, Chapter 20," by Charles Munger, 1999 (Publisher: National Association of Corrosion Engineers). Such linings are applied in sheets and require adhesive bonding to the metal surface as well as at the overlays. The application is craft sensitive and time consuming.

To overcome the disadvantages of the ebonite or hard-rubber linings, several single-component liquid rubber based ebonite coatings have also been disclosed by Rappoport in U.S. Pat. No. 5,766,687 and U.S. Pat. No. 5,997,953, by Figovsky in WO 0,006,639, and by Petrovic et al. in DE 3,740,181. These liquid coatings can be rolled, brushed, trowelled or sprayed onto the metal surface to form a monolithic layer, thus simplifying the application.

However, these single component ebonite coatings still suffer from two major drawbacks. First, they will sag, drip, flow or run off on a non-horizontal surface when subjected to the subsequent heating during the vulcanization stage and result in uneven coating, which compromises its protective function. Second, their surface is tacky, making it difficult for multiple coats.

To overcome the run-off problem and to achieve a tack free surface to facilitate handling, Chang et al. in U.S. Pat. No. 6,482,894 disclosed a two-component liquid ebonite coating system. The second component is based on an unsaturated liquid rubber which contains a functional group capable of reacting with the functional group in the first component at room temperature. When the two components are mixed and applied, e.g. by spraying, onto a metal substrate, the coating will gel at the room temperature and thus prevents run-off during the subsequent vulcanization stage. Hoelter et al. in U.S. Pat. Application 2002/0002244 also proposed a two component coating system, with the second component being mainly low molecular weight polyisocyanates. Although the two-component liquid ebonite coatings solved the run-off problem, the two component coating system of Hoelter et al. requires an extra step of mixing the two components before application onto the metal substrate.

To overcome the shortcomings of aforementioned various linings and coatings, the present invention discloses a single-component moisture activated liquid ebonite coating that does not require premixing and does not sag or run off.

SUMMARY OF THE INVENTION

We have discovered that a single component sag-free liquid ebonite coating can be realized by judicial selection and addition of silane coupling agents to the ebonite mixture. The present invention provides a single component moisture activated liquid ebonite composition that is particularly useful for coating applications in protecting metal from corrosion and chemical attack. In some embodiments, the single component moisture activated liquid ebonite composition having a total mass percentage of 100 is comprised of:

liquid unsaturated rubber of about 15–85 mass percentage;

sulfur of about 10–50 mass percentage;

a vulcanization activator, such as zinc oxide, magnesium oxide, or their metallic salts, of about 5–35 mass percentage;

a vulcanization accelerator of about 0.2–2.0 mass percentage;

carbon black of about 1–10 mass percentage;

a first silane of about 5–10 mass percentage, the first silane is particularly selected such that it can chemically bond to the liquid unsaturated rubber while leaving the alkoxy groups thereof intact, thereby converting the liquid unsaturated rubber to alkoxy functionality at the end of the treatment with the first silane;

a second silane of about 1–10 mass percentage, the second silane consuming and scavenging moisture originally present in the mixture, substantially increasing the shelf stability of the mixture, the second silane is substantially non-reactive during the treatment with the first silane;

a third silane of about 1–10 mass percentage, the third silane containing sulfur linkages and reacting with the sulfur during vulcanization, the third silane can be selected with the right reactive functional group to replace the first silane or the second silane;

an optional catalyst of about 0.01–2 mass percentage, the catalyst promoting and accelerating reaction of the liquid unsaturated rubber and the first silane;

a filler of about 0–60 mass percentage;

optional additives of about 0–10 mass percentage; and an optional diluent or solvent of about 0–30 mass percentage can be added to control viscosity of the mixture.

The composition exhibits adequate shelf stability without pre-gelling during storage and shipping. The coatings can be applied by a single component spray equipment onto a metal substrate, the moisture in the ambient will activate silane coupling agent(s) and gel the coating, which prevents sagging, dripping or run-off. The coatings also become tack free within 24 hours, making it possible for inspection as well as facilitating multiple coats when necessary. The single component sag-free liquid ebonite coatings thus greatly simplify the manufacturing, handling, shipping and application processes. After the coatings are subjected to a subsequent vulcanization at elevated temperatures, they develop excellent physical and adhesion properties. The coatings are particularly useful for protecting a metal substrate from corrosion and chemical attack.

DESCRIPTION OF THE INVENTION

According to the present invention, the single component sag-free liquid ebonite coating composition consists of the following ingredients and their mass percentages. The total mass percentage of all ingredients must be 100%.

|  | Mass % |
| --- | --- |
| 1. Liquid unsaturated rubber | 15–85 |
| 2. Sulfur | 10–50 |
| 3. Zinc Oxide or Magnesium oxide | 5–35 |
| 4. Vulcanization accelerator | 0.2–2.0 |
| 5. Carbon black | 1–10 |
| 6. First silane capable of chemical bonding to 1 | 5–10 |
| 7 Second silane as moisture scavenger | 1–10 |
| 8. Third silane capable of reacting with sulfur during vulcanization | 1–10 |
| 9. Catalyst that promotes reaction of 1 and 6 | 0.01–2 |
| 10. Filler | 0–60 |
| 12. Other additives | 0–10 |
| 13. Diluent or solvent | 0–30 |
| Total | 100% |

The liquid unsaturated rubber has the general formula of:

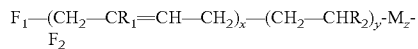

Where $R_1$=H or $CH_3$ $R_2$=H, $CH_3$, $C_2H_5$, phenyl, nitrile, acrylate, acetate, etc.

$F_1$=H, $CH_3$, OH, COOH, $NH_2$, NCO, epoxy, vinyl, acrylate, anhydride, etc.

$F_2$=H, $CH_3$, OH, COOH, $NH_2$, NCO, epoxy, vinyl, acrylate, anhydride, etc.

$F_1$ and $F_2$ can be the same or different.

M is the third monomer, which can be noborene, hexadiene or cyclopentadiene, etc.

When $F_1$ and $F_2$ are either H or CH3, the liquid rubber is called non-functional. The liquid rubber can be linear which contains two chain ends, or branched which contains more than two chain ends or functional groups. The liquid rubber can also be partially epoxidized or maleinized through its double bonds.

Preferably, $5<x+y+z<150$ so that the molecule is liquid at ambient temperature. The molecular mass of the liquid rubber can be from 200 to 10,000, preferably from 1,000 to 8000, and most preferably from 2,500 to 6,000. Also, it is preferable that $x/(x+y+z)>0.4$ so that there are sufficient double bonds for sulfur vulcanization, and this is true even if the liquid rubber is partially epoxidized or maleinized.

The composition can contain a mixture of liquid rubbers that have different molecular mass or functional groups so long as they do not react under ambient condition.

Some commercial liquid rubber include hydroxyl terminated polybutadiene Polybd 45HTLO and Polybd R-20 LM from Atofina, Liquiflex H and Liquiflex P from Petroflex, Krasol LBH from Kaucuk, isocyanate terminated polybutadiene Krasol LBD, Krasol NN, and Krasol NH from Kaucuk, maleinized polybutadiene Krasol LBM from Kaucuk, Ricon MA from Ricon Chemicals, epoxidized polybutadiene Polybd 600E and Polybd 605E from Atofina, nonfunctional polybutadiene Krasol LB, Krasol PS, Krasol PP from Kaucuk, Ricon from Ricon Chemicals, isolene polyisoprene and DPR liquid natural rubber from Elementis, Ricon copolymer for butadiene and styrene from Ricon Chemicals, acrylic terminated polybutadiene Ricacryl from Ricon Chemicals, etc.

Sulfur can be rubber makers sulfur such as Redball Superfine supplied by International Sulfur or insoluble sulfur such as Crystex supplied by Flexsys, or their equivalents.

Optionally, a portion of the sulfur can be replaced by an organic sulfur donor compound such as Sulfasan DTDM supplied by Harwick Chemicals, or its equivalents.

Zinc oxide is commonly used as activator during sulfur vulcanization reaction with unsaturated rubber. Magnesium oxide or other metal oxides are sometimes used. The metal oxides can be totally or partially replaced with their metallic salts such as zinc stearate, etc.

Accelerators speed up the sulfur vulcanization reaction and allow the reaction to complete either at a lower temperature or in a shorter time. Commonly used accelerators include thiurams such as tetramethylthiuram disulfide, tetrabutylthiruram disulfide, tetraisobutylthiuram disulfide, tetrabenzylthiuram disulfide, tetraalkylthiuram disulfide, 2-mercaptobenzothiazole, benzothiazyl disulfide, N-oxydiethylenebenzothiazole-2-sulfenamide, N-cyclohexyl-benzothiazole-2-sulfenamide, N-tert-butyl-2-benzothiazolesulfenamide, diphenylguanidiene, N,N'-ditolylguanidiene, aldehyde-aniline condensation products, bismuth dimethyldithiocarbamate, cadmium dimethyldithiocarbamate, cadmium diethyldithiocarbamate, copper dimethyldithiocarbamate, lead dimethyldithiocarbamate, selenium dimethldithiocarbamate, selenium diethyldithiocarbamate, Tellurium dimethyldithiocarbamate, zinc dimethyldithiocarbamate, zinc diethyldithiocarbamate, zinc di-n-butyldithiocarbamate, zinc diamyldithiocarbamate, thiodiazine, diethylthiourea, trimethylthiourea, dibuylthiourea, zinc isopropyl xanthate, etc.

Carbon black is used for color, enforcement or to impart thermal or electrical conductivity to the ebonite vulcanizates.

The general formula for silanes is $R_n Si X_{(4-n)}$, where Si is a silicon atom, R is an alkyl radical containing a reactive functional group and X is an alkoxy group, most commonly methoxy, ethoxy or butoxy groups, and n is between 1 to 3. The reactive functional group of the first silane is so selected that will chemically bond to the unsaturated liquid rubber while leaving alkoxy groups intact. For example, if a hydroxyl terminated liquid rubber is chosen, an isocyanate or anhydride functional silane can be employed. If an epoxidized liquid rubber is chosen, an amine functional silane can be used. If an isocyanate functional liquid rubber is chosen, either a hydroxyl, or amine functional silane can be used. If a non-functional liquid rubber is chosen, an acryl functional silane is selected. With peroxide or UV, the acrylic group can bond to the double bonds of the unsaturated liquid rubber. At the end of the first silane treatment, the liquid rubber is converted to alkoxy functionality. It is important that during the silane treatment and in the subsequent storage, moisture should be kept out or minimized so that the water molecules in the ambient will not react to alkoxy groups prematurely.

A second silane is added to work as a moisture scavenger. It is quite common that any raw materials in the formulation could contain a small amount of adsorbed or absorbed water. The second silane is added to consume, through its alkoxy groups, water that are originally present in the formulation. The functional group on the second silane is substantially non-reactive during the treatment with the first silane. The addition of the second silane can greatly increase the shelf stability of the mixtures.

Also, a third silane containing sulfur linkages can be added. Such sulfur containing silane has the general formula of $R_n X_{(3-n)} Si—S_m—SiX_{(3-n)} R_n$, where Si, R and X are the same as previously defined and n is between 0 to 2 and m is between 2 to 8. The sulfur linkage allows the third silane to be incorporated into the sulfur-rubber networks during the vulcanization reaction and render better physical properties. The third silane, if it has the right reactive functional group, can be used to replace the first silane to react with the functional group of liquid rubber to impart alkoxy groups, or it can be used to replace the second silane as moisture scavenger.

In the treatment of liquid rubber with the first silane, a catalyst may be added to accelerate the chemical reaction. For example, if a hydroxyl terminated liquid rubber is selected and a silane with isocyanate function group is used, a catalyst such as DABCO T12 (dibutyl tin dilaurate) can be used to speed up the reaction. Those skilled in the art will have no problem in selecting a proper catalyst depending on the functional group on the liquid rubber and that of the first silane.

There are a variety of pigments or fillers that can be added to the mixture: fly ash, pumice, calcium carbonate, titanium dioxide, precipitated silica, fused silica, quartz, silicates, barium sulfide, talc, aluminum oxide, clay, iron oxide, micaceous iron oxide, glass flake, zinc sulfide, felspar, wallastonite, mica, grounded rubber particles, zinc borate, etc.

There are also additives that can be incorporated into the mixture including thixotropic agents, deaerating agents, defoaming agents, leveling agents, adhesion promoters, surfactants, dispersing agents, anti-settling agents, fungicides, corrosion inhibitors, colorants, etc. Optionally, some inorganic moisture scavenger such as zeolites can also be added.

To control viscosity, sometimes a diluent or solvent can be added to facilitate spray or other type of applications.

The following are some working examples:

| | Ingredient | Exp 1 | Exp 2 | Exp 3 |
|---|---|---|---|---|
| Polybd 45HTLO | Hydroxyl terminated liquid butadiene (AtoFina) | 46.26 | 46.27 | 46.26 |
| Redball Superfine | Sulfur (International Sulfur) | 23.12 | 23.13 | 23.12 |
| Kadox 930 | Zinc oxide (Zinc Corporation of America) | 16.18 | 16.19 | 16.18 |
| Mogul L | Carbon black (Cabot) | 0.93 | 0.93 | 0.93 |
| Silquest A-link 35 | Isocyanate functional silane (OSi Crompton) | 8.56 | 8.56 | 8.56 |
| Silquest A 171 | Vinyltrimethoxysilane (OSi Crompton) | 1.74 | | |
| Silquest A 189 | Mercaptotrimethoxysilane (OSi Crompton) | | 1.74 | |
| Silquest A 1289 | Bis-(triethoxysilylpropyl)-Tetrasulfide (OSi Crompton) | | | 1.74 |
| Aerosil R972 | Fumed silica (Degussa) | 1.24 | 1.24 | 1.24 |
| Dabco T12 | Catalyst (Air Products) | 0.12 | 0.09 | 0.12 |
| Royalac 150 | Tetraalkylthiuram disulfide (Uniroyal Chemicals) | 1.85 | 1.85 | 1.85 |

First, Polybd 45HTLO, Redball Superfine, Kadox 930, Mogul L are hand mixed to wet the powders. The mixture was then stirred using a laboratory high-speed disperser at 2500 rpm for about 10 minutes to achieve homogeneous dispersion. Silanes and Royalac 150 were next added while keep stirring at the same speed for one minute. The speed was reduced to 500 rpm and Aerosil R972 was added until it was well dispersed and the mixture became homogenous. Dabco T12 was added after the mixture cooled down to room temperature. After 24 hours, the isocyanate functional group of Silquest A-link 35 reacted with the hydroxyl groups of Polybd 45HTLO and the liquid rubber was converted to having alkoxysilane functionality.

To ensure the shelf stability, the final mixture was sealed in a one-quart metal can and placed in a 70° C. oven for three days. The mixture remained fluid without a significant increase in viscosity, so it had adequate shelf stability.

To test the sag resistance and tack free time, a standardized steel panel (Q-Panel) was coated with the mixture by using a doctor blade to obtain a 10-mil coating thickness, and placed in a vertical position for 24 hours to check sagging according to ASTM D4400. During the same period, the coating was activated by the ambient moisture (relative humidity was 38–45%) and started gelling. The tack free time was determined according to ASTM D2377-84.

To test the physical properties of the coatings, a 20-mil coating was applied onto a Q-Panel by a doctor blade. The coated Q-Panel was then placed in an air-circulated oven. The oven temperature was programmed to rise from 23° C. to 180° C. at the rate of 0.9° C. per minutes. The temperature was maintained at 180° C. for one hour to fully vulcanize the coating. The Shore D hardness, Pencil Hardness and Impact Resistance were tested according to the ASTM test methods.

To determine the adhesion strength to the steel surface, a 20 mil coating was applied onto a ⅛" carbon steel, the surface of which has previously been sand-blasted to white metal according to the NACE Standard #2. The coating was then vulcanized using the same temperature profile described in the previous paragraph. After the coating was cooled down to 23° C., the adhesion strength was determined by ASTM D4541.

All test results are summarized in TABLE I below.

TABLE I

| Property | Test Method | Exp 1 | Exp 2 | Exp 3 |
|---|---|---|---|---|
| Shelf Stability | 72 Hours @70° C. | Pass | Pass | Pass |
| Sag Resistance | ASTM D4400 | No Sag | No Sag | No Sag |
| Tack Free Time | ASTM D2377 | 24 hours | 16 hours | 18 hours |
| Shore D Hardness | ASTM D2240 | 87 | 86 | 86 |
| Pencil Hardness | ASTM D3363 | HB | HB | HB |
| Impact Resistance | ASTM D2794 | | | |
| Front | | 48 lb-in | 56 lb-in | 20 lb-in |
| Back | | 4 lb-in | 56 lb-in | 4 lb-in |
| Adhesion (psi) | ASTM D4541 | 1700 | 1500 | 1550 |

Although the present invention and its advantages have been described in detail, it should be understood that the present invention is not limited to or defined by what is shown or discussed herein. The drawings, description and discussion herein illustrate technologies related to the invention, show examples of the invention and provide examples of using the invention. Known methods, procedures, systems, elements or components may be discussed without giving details, so to avoid obscuring the principles of the invention. One skilled in the art will realize that implementations of the present invention could be made without departing from the principles, spirit or legal scope of the present invention. Accordingly, the scope of the present invention should be determined by the following claims and their legal equivalents.

We claim:

1. A single component moisture activated liquid ebonite composition having a total mass percentage of 100 comprised of:
   liquid unsaturated rubber of about 15–85 mass percentage;
   sulfur of about 10–50 mass percentage;
   a vulcanization activator of about 5–35 mass percentage;
   a vulcanization accelerator of about 0.2–2.0 mass percentage;

carbon black of about 1–10 mass percentage;
a first silane of about 5–10 mass percentage, said first silane converting said liquid unsaturated rubber to alkoxy functionality;
a second silane of about 1–10 mass percentage, said second silane scavenging moisture originally present therein;
a third silane of about 1–10 mass percentage, said third silane containing sulfur linkages and reacting with said sulfur during vulcanization;
a catalyst of about 0.01–2 mass percentage, said catalyst promoting reaction of said liquid unsaturated rubber and said first silane;
a filler of about 0–60 mass percentage;
additives of about 0–10 mass percentage; and
a diluent or solvent of about 0–30 mass percentage.

2. The single component moisture activated liquid ebonite composition of claim 1, in which said first silane has a formula of
$R_n Si X_{(4-n)}$; wherein
Si is a silicon atom;
X is an alkoxy group;
n is between 1 to 3; and
R is an alkly radical containing a reactive functional group selected such that said first silane is capable of chemically bonding to said unsaturated liquid rubber while leaving said alkoxy group intact.

3. The single component moisture activated liquid ebonite composition of claim 1, wherein said second silane contains alkoxy groups and wherein said second silane is substantially non-reactive during treatment with said first silane.

4. The single component moisture activated liquid ebonite composition of claim 1, in which said third silane has a formula of:
$R_n X_{(3-n)} Si-S_m-SiX_{(3-n)} R_n$; wherein
R is an alkly radical containing a reactive functional group;
X is an alkoxy group;
Si is a silicon atom;
n is between 0 to 2;
m is between 2 to 8.

5. The single component moisture activated liquid ebonite composition of claim 1, wherein said liquid unsaturated rubber is selected from the group consisting of polybutadiene, polyisoprene, poly(butadiene-co-acrylonitrile), poly(isobutyl-co-isoprene), and poly(ethylene-co-propylene-co-diene) having at least two reactive functional groups.

6. The single component moisture activated liquid ebonite composition of claim 5, wherein each of said reactive functional groups is selected from the group consisting of hydroxyl, epoxy, anhydride, isocyanate, and amine.

7. The single component moisture activated liquid ebonite composition of claim 1, in which said liquid unsaturated rubber having a formula of
$F_1-(CH_2-CR_1=CH-CH_2)_x-(CH_2-CHR_2)_y-M_z-F_2$; wherein
$R_1$ is H or $CH_3$;
$R_2$ is H, $CH_3$, $C_2H_5$, phenyl, nitrile, acrylate, or acetate;
$F_1$ is H, $CH_3$, OH, COOH, $NH_2$, NCO, epoxy, vinyl, acrylate, or anhydride;
$F_2$ is H, $CH_3$, OH, COOH, $NH_2$, NCO, epoxy, vinyl, acrylate, or anhydride;
M is a monomer selected from the group consisting of noborene, hexadiene, and cyclopentadiene; and
x, y, and z are integers and x>0, y>0, and z>0.

8. The single component moisture activated liquid ebonite composition of claim 7, wherein
5<x+y+z<150.

9. The single component moisture activated liquid ebonite composition of claim 7, wherein
x/(x+y+z)>0.4.

10. The single component moisture activated liquid ebonite composition of claim 1, wherein
said liquid unsaturated rubber having a molecular mass of about 200 to about 10,000.

11. The single component moisture activated liquid ebonite composition of claim 1, wherein
a portion of said sulfur is provided by an organic sulfur donor compound.

12. The single component moisture activated liquid ebonite composition of claim 1, wherein
said vulcanization activator is a metal oxide, a metallic salt, or a combination thereof.

13. The single component moisture activated liquid ebonite composition of claim 12, wherein
said metal oxide is zinc oxide or magnesium oxide.

14. The single component moisture activated liquid ebonite composition of claim 12, wherein
said metallic salt is zinc stearate.

15. The single component moisture activated liquid ebonite composition of claim 1, wherein said vulcanization accelerator is selected from the group consisting of thiurams, tetramethylthiuram disulfide, tetrabutylthiruram disulfide, tetraisobutylthiuram disulfide, tetrabenzylthiuram disulfide, tetraalkylthiuram disulfide, 2-mercaptobenzothiazole, benzothiazyl disulfide, N-oxydiethylenebenzothiazole-2-sulfenamide, N-cyclohexyl-benzothiazole-2-sulfenamide, N-tert-butyl-2-benzothiazolesulfenamide, diphenylguanidiene, N,N'-ditolylguanidiene, aldehyde-aniline condensation products, bismuth dimethyldithiocarbamate, cadmium dimethyldithiocarbamate, cadmium diethyldithiocarbamate, copper dimethyldithiocarbamate, lead dimethyldithiocarbamate, selenium dimethldithiocarbamate, selenium diethyldithiocarbamate, Tellurium dimethyldithiocarbamate, zinc dimethyldithiocarbamate, zinc diethyldithiocarbamate, zinc di-n-butyldithiocarbamate, zinc diamyldithiocarbamate, thiodiazine, diethylthiourea, trimethylthiourea, dibuylthiourea, and zinc isopropyl xanthate.

16. The single component moisture activated liquid ebonite composition of claim 1, wherein said single component moisture activated liquid ebonite composition does not require premixing and is activated by ambient moisture.

17. The single component moisture activated liquid ebonite composition of claim 16, wherein said ambient moisture has a relative humidity of about 38–45%.

* * * * *